United States Patent [19]

Hibi

[11] Patent Number: 4,502,050

[45] Date of Patent: Feb. 26, 1985

[54] POSITION DISCRIMINATION DEVICE FOR A THUMB WHEEL SWITCH

[75] Inventor: Toshio Hibi, Yokohama, Japan

[73] Assignee: Tokyo Shibaura Denki Kabushiki Kaisha, Japan

[21] Appl. No.: 367,768

[22] Filed: Apr. 12, 1982

[30] Foreign Application Priority Data

Apr. 24, 1981 [JP] Japan ................. 56-62227

[51] Int. Cl.³ .............................................. G08C 9/00
[52] U.S. Cl. ........................... 340/870.01; 340/347 P; 377/17; 377/86
[58] Field of Search ........................ 377/82, 84, 86, 87, 377/17, 18, 126; 340/347 P, 870.01

[56] References Cited

U.S. PATENT DOCUMENTS

| 2,733,430 | 1/1956 | Steele | 340/347 P |
| 2,823,345 | 2/1958 | Ragland | 340/347 P |
| 2,867,797 | 1/1959 | Greene | 340/347 P |
| 4,016,432 | 4/1977 | Marzalek | 377/126 |
| 4,334,222 | 6/1982 | Kelley | 340/347 P |

FOREIGN PATENT DOCUMENTS 53-146670 5/1977 Japan.
54-25874 7/1977 Japan.

Primary Examiner—James J. Groody
Assistant Examiner—Michael F. Heim
Attorney, Agent, or Firm—Finnegan, Henderson, Farabow, Garrett & Dunner

[57] ABSTRACT

A position discrimination device for a thumb wheel switch comprises a shift register and a ROM. The output data from the shift register and the data, determined by an inverted output from the shift register and by an output from a conductive terminal which corresponds to a state of the thumb wheel switch, are written into the ROM. The ROM supplies data to the shift register and generates a code signal corresponding to the state of the thumb wheel switch.

7 Claims, 11 Drawing Figures

F I G. 2
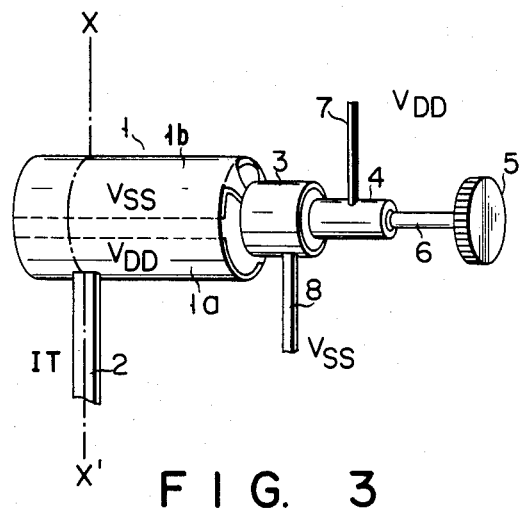
F I G. 3
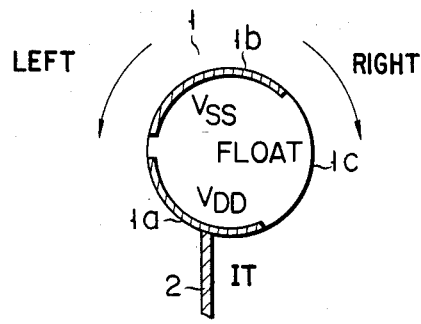

|  | $SAI_2$ | $SAI_1$ |
|---|---|---|
| $V_{SS}$ | 0 | 0 |
| $V_{DD}$ | 0 | 1 |
| FLOAT | 1 | 1 |
| DUM | 1 | 0 |

FIG. 5

| INPUT | | | | OUTPUT | | | | |
|---|---|---|---|---|---|---|---|---|
| MQ2 | MQ1 | MQ0 | AI | XMQ2 | XMQ1 | XMQ0 | SAI2 | SAI1 |
| 0 | 0 | 0 | 0 | 0 | 1 | 0 | 1 | 0 |
| 0 | 0 | 0 | 1 | 1 | 1 | 1 | 1 | 0 |
| 0 | 0 | 1 | 0 | 1 | 0 | 0 | 1 | 0 |
| 0 | 0 | 1 | 1 | 1 | 0 | 1 | 1 | 0 |
| 0 | 1 | 0 | 0 | 0 | 1 | 0 | 0 | 0 |
| 0 | 1 | 0 | 1 | 0 | 1 | 1 | 0 | 0 |
| 0 | 1 | 1 | 0 | 0 | 0 | 0 | 1 | 0 |
| 0 | 1 | 1 | 1 | 0 | 0 | 1 | 1 | 0 |
| 1 | 0 | 0 | 0 | 0 | 0 | 0 | 1 | 1 |
| 1 | 0 | 0 | 1 | 1 | 1 | 1 | 1 | 1 |
| 1 | 0 | 1 | 0 | 1 | 1 | 0 | 0 | 1 |
| 1 | 0 | 1 | 1 | 1 | 0 | 1 | 0 | 1 |
| 1 | 1 | 0 | 0 | 0 | 0 | 0 | 1 | 0 |
| 1 | 1 | 0 | 1 | 0 | 0 | 1 | 1 | 0 |
| 1 | 1 | 1 | 0 | 1 | 0 | 0 | 1 | 1 |
| 1 | 1 | 1 | 1 | 0 | 0 | 1 | 1 | 1 |

FIG. 7

| INPUT | | | | OUTPUT | | | |
|---|---|---|---|---|---|---|---|
| SAI2 | SAI1 | MODE2 | MODE1 | XMODE2 | XMODE1 | ROUT | LOUT |
| 0 | 0 | 0 | 0 | 0 | 0 | 0 | 0 |
| 0 | 0 | 0 | 1 | 0 | 0 | 1 | 0 |
| 0 | 0 | 1 | 0 | 0 | 0 | 0 | 0 |
| 0 | 0 | 1 | 1 | 0 | 0 | 0 | 1 |
| 0 | 1 | 0 | 0 | 0 | 1 | 0 | 1 |
| 0 | 1 | 0 | 1 | 0 | 1 | 0 | 0 |
| 0 | 1 | 1 | 0 | 0 | 1 | 0 | 0 |
| 0 | 1 | 1 | 1 | 0 | 1 | 1 | 0 |
| 1 | 0 | 0 | 0 | 1 | 0 | 0 | 0 |
| 1 | 0 | 0 | 1 | 1 | 0 | 0 | 0 |
| 1 | 0 | 1 | 0 | 1 | 0 | 0 | 0 |
| 1 | 0 | 1 | 1 | 1 | 0 | 0 | 0 |
| 1 | 1 | 0 | 0 | 1 | 1 | 1 | 0 |
| 1 | 1 | 0 | 1 | 1 | 1 | 0 | 1 |
| 1 | 1 | 1 | 0 | 1 | 1 | 0 | 0 |
| 1 | 1 | 1 | 1 | 1 | 1 | 0 | 0 |

POSITION DISCRIMINATION DEVICE FOR A THUMB WHEEL SWITCH

BACKGROUND OF THE INVENTION

The present invention relates to a level discrimination device for a thumb wheel switch, which detects the respective levels of $V_{DD}$ (power source), $V_{SS}$ (GND) and FLOAT (insulation) of the thumb wheel switch to thereby detect the direction of rotation of the switch.

In a conventional thumb wheel switch, the direction of rotation is determined by detecting the phase difference between the output signals from, for example, two switches. FIG. 1 shows the timing charts of the signals, wherein $\phi1$ is a reference signal and $\phi2$ and $\phi2'$ are signals which are outputted upon rotation of the thumb wheel switch. The phase difference between the signal $\phi2$ and the reference signal $\phi1$ is detected, using a strobe signal $\phi B$, and the phase difference between the signal $\phi2'$ and the reference signal $\phi1$ is detected, using a strobe signal $\phi A$. The signal $\phi2$ is detected, when the switch has been rotated clockwise. The signal $\phi2'$ is detected, when the switch has been rotated counterclockwise.

Since the above-mentioned method uses strobe signals $\phi A$ and $\phi B$ to detect the direction in which the thumb wheel switch is rotated, the level discrimination device needs a timing circuit and its overall structure becomes complex. In addition, the method cannot detect the respective levels of the thumb wheel switch.

SUMMARY OF THE INVENTION

It is an object of the present invention to provide a level discrimination device which is simple in structure and which can detect the respective levels of a thumb wheel switch.

It is another object of the invention to provide a level discrimination device for a thumb wheel switch, which is simple in structure and which can discriminate the direction of rotation of the switch.

In order to achieve these objects, there is provided the present invention provides a level discrimination device for a thumb wheel switch, comprising a shift register and code signal generator. The shift register sequentially shifts input data at a constant frequency outputs the input data. The code signal generator receives output data from the shift register. It also receives data, from a conductive terminal, corresponding to the level of the thumb wheel switch, and an inverted output from the shift register. The code signal generator generates data to be supplied to the shift register and a code signal corresponding to the level of the conductive terminal. The level discrimination device may further include a direction signal generator. The direction signal generator receives the code signals from the code signal generator and generates a direction signal representing the direction of rotation of the thumb wheel switch, in accordance with the order in which the code signals are supplied to it.

BRIEF DESCRIPTION OF THE DRAWINGS

FIG. 2 is a perspective view of a contact part of a thumb wheel switch to which an embodiment of the present invention is applied;

FIG. 3 is a sectional view of the contact part shown in FIG. 2, taken along line X-X';

FIG. 5 is a truth table illustrating the function of a ROM used in the level discrimination device shown in FIG. 2;

FIG. 7 is a truth table illustrating the function of a MODE ROM used in the level discrimination device shown in FIG. 2;

DETAILED DESCRIPTION OF THE PREFERRED EMBODIMENTS

Figure 1:
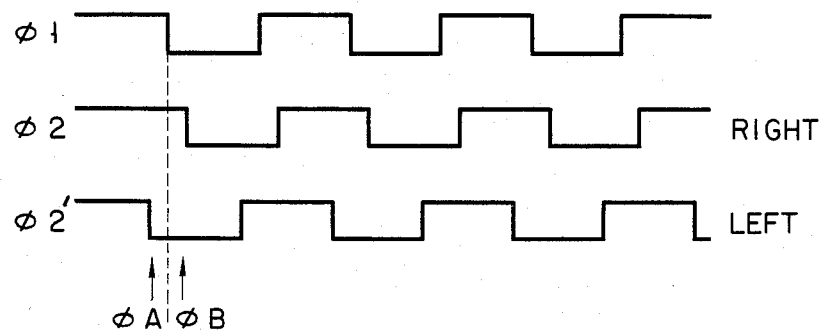
FIG. 1 is a timing chart of signals obtained by a conventional method of detecting the direction of rotation of a thumb wheel switch.

Referring now to the drawings, wherein like reference numerals designate identical or corresponding parts throughout the several views, and more particularly to FIGS. 2 and 3 thereof, the contact part of a thumb wheel switch is shown. A $V_{DD}$ (power source) part 1a, a $V_{SS}$ (GND) part 1b and a FLOAT part 1c are formed on the outer circumference of a cylindrical member 1. An input terminal (IT) 2 is so positioned as to contact successively the $V_{DD}$ part 1a, $V_{SS}$ part 1b and FLOAT part 1c. The FLOAT part 1c lies between the $V_{DD}$ part 1a and the $V_{SS}$ part 1b. Another gap between the $V_{DD}$ part 1a and the $V_{SS}$ part 1b is narrow enough to permit state transition from $V_{DD}$ to $V_{SS}$, or vice versa. Hence, a floating voltage level is generated at the FLOAT part 1c, but no substantial floating voltage level is generated at the gap. As the thumb wheel switch is rotated in either direction and the gap passes by the input terminal (IT) 2, the state transition between $V_{DD}$ and $V_{SS}$ levels is achieved instantaneously, generating substantially no floating level voltage.

Further provided are other cylindrical members 3 and 4 which each have an electrically conductive surface. The cylindrical member 3 is connected to the cylindrical member 1 and coaxial therewith. The cylindrical member 4 is connected to the cylindrical member 3 and is coaxial therewith and is coupled with a shaft 6 of a wheel 5. More specifically, the surface of the cylindrical member 3 is connected to the $V_{SS}$ part 1b. Similarly, the surface of the cylindrical member 4 is connected to the $V_{DD}$ part 1a, though not shown in FIG. 2. A $V_{DD}$ terminal 7, which is an electrically conductive elastic member, is positioned so that its end is in contact with the surface of the cylindrical member 4. The potential of the terminal 7 is at ground level. A $V_{SS}$ terminal 8, which is an electrically conductive elastic member, is provided for supplying negative voltage. The $V_{SS}$ terminal 8 has one end in contact with the surface of the cylindrical member 3.

Figures 4, 6:
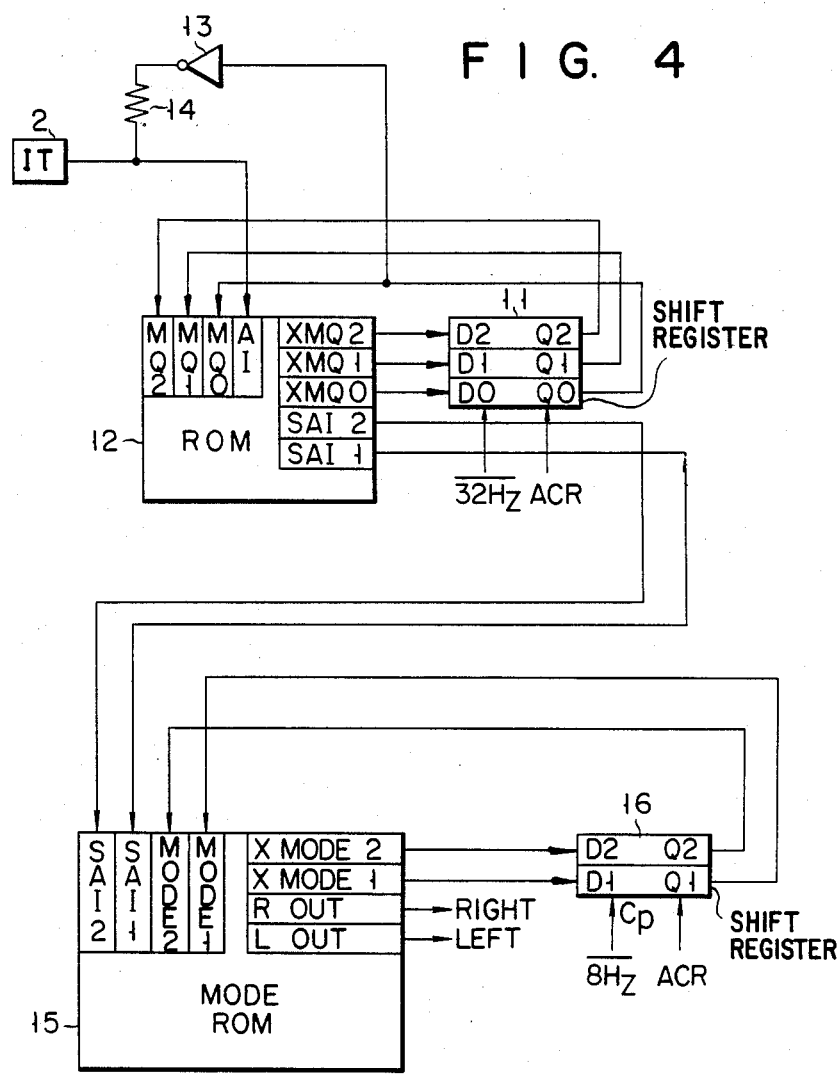
FIG. 4 is a block diagram of the level discrimination device shown in FIG. 2.
FIG. 6 is a table of codes representing the levels of an input terminal.

FIG. 4 shows a level discrimination device according to the present invention. The device is designed to detect the voltage level of a thumb wheel switch, thereby determining the direction of rotation of the thumb wheel switch. As shown in FIG. 4, the device comprises a shift register 11, a ROM (read only memory) 12, an inverter 13, a resistor 14, a MODE ROM 15 and another shift register 16. The shift register 11 receives input data at input terminals D2, D1 and D0, sequentially shifts the input data in synchronism with clock pulses of 32 Hz, and outputs the data through output terminals Q2, Q1 and Q0. The outputs from the output terminals Q2, Q1 and Q0 are supplied to input terminals MQ 2, MQ 1 and MQ 0 of the ROM 12, respectively. The output from the output terminal Q0 is supplied also to the input terminal (IT) 2 of the thumb wheel switch and the input terminal of the ROM 12 through the inverter 13 and the resistor 14 (1 MΩ). That is, when the input terminal (AI) 2 is open (=FLOAT), it is in a high impedance state. The output from the inverter 13 is therefore supplied to the input terminal of the ROM 12, which is in a low impedance state. In this case, the input terminal (IT) 2 is pulled up to a logic level of "1", when the output signal from the inverter 13 is at a logic level of "1". Then, this signal is supplied to the input terminal of the ROM 12. Conversely, the input terminal (IT) 2 is pulled down to a logic level of "0" when the output signal from the inverter 13 is at a logic level of "0". Then, this signal is supplied to the input terminal of the ROM 12. When the input terminal (IT) 2 is at a logic level of "1" (=$V_{DD}$), the output from the inverter 13 does not appear at the output side of the input terminal (IT) 2. Then, a signal indicating a logic level of "1" is supplied to the input terminal of the ROM 12. When the input terminal (IT) 2 is at a logic level of "0" (=$V_{SS}$), the output from the inverter 13 does not appear at the output side of the input terminal (IT) 2, either. Then, a signal indicating a logic level of "0" is supplied to the input terminal of the ROM 12. The ROM 12 outputs the data from the input terminal (IT) 2 and the data from the shift register 11 through output terminals XMQ 2, XMQ 1, XMQ 0, SAI 2, SAI 1 according to the truth table of FIG. 5.

The outputs from the output terminals XMQ 2, XMQ 1, XMQ 0 are supplied to input terminals D2, D1 and D0 of the shift register 11, respectively. The outputs from the output terminals SAI 2 and SAI 1 are input to the MODE ROM 15. FIG. 6 shows the codes representing the levels at the input terminal (IT) 2 which correspond to the outputs from the output terminals SAI 2 and SAI 1.

The MODE ROM 15 receives input data through input terminals SAI 2, SAI 1, MODE 2 and MODE 1 and outputs the same data through output terminals XMODE 2, XMODE 1, R OUT and L OUT according to the truth table shown in FIG. 7. The outputs from the terminals XMODE 2 and XMODE 1 are supplied to input terminals D2 and D1 of the shift register 16, respectively. Clock pulses of 8 Hz are supplied to a terminal Cp of the shift register 16. The outputs from the output terminals Q2 and Q1 of the shift register 16 are supplied to the input terminals MODE 2 and MODE 1 of the MODE ROM 15, respectively.

In synchronism with the 8 Hz clock pulses, the MODE ROM 15 outputs a RIGHT signal or a LEFT signal representing the direction of rotation of the thumb wheel switch, in accordance with the sequence of the code signals supplied from the output terminals SAI 2 and SAI 1 of the ROM 12.

Figure 8:
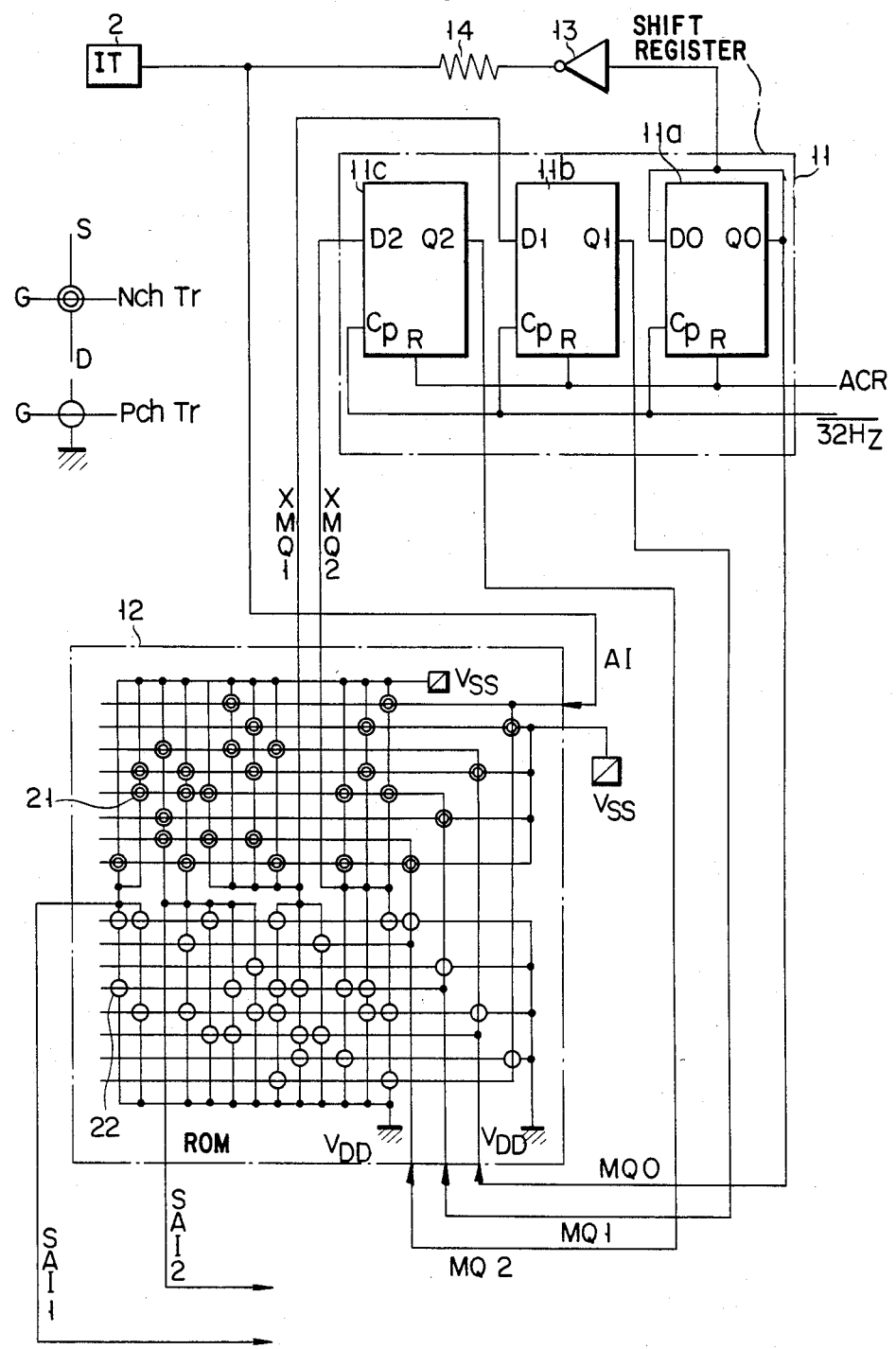
FIG. 8 is a circuit diagram illustrating the ROM and a shift register, both shown in FIG. 4.

As shown in FIG. 8, the shift register 11 comprises three D flip-flops 11a, 11b and 11c. As shown also in FIG. 8, the ROM 12 comprises a plurality of n-channel MOS transistors 21 and a plurality of p-channel MOS transistors 22. The MODE ROM 15 shown in FIG. 4 is similar to the ROM 12 in structure.

Figure 9:
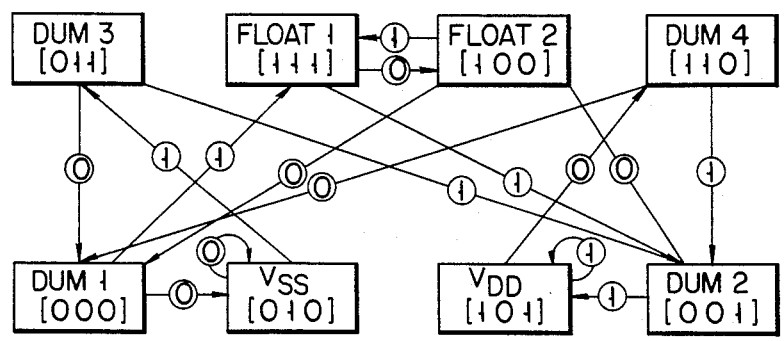
FIG. 9 shows the status transition of the input terminal.
Figure 10A:
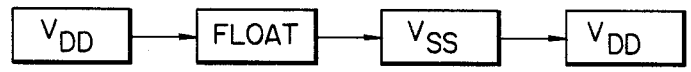
FIGS. 10a and 10b illustrate how to detect the direction of rotation of the thumb wheel switch.
Figure 10B:
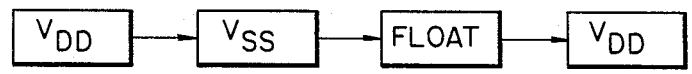

The level discrimination device described above may operate in various modes as will be explained with reference to FIG. 9 which illustrates the status transition of the input terminal (IT) 2 of the thumb wheel switch. Suppose the input terminal (IT) 2 is put in contact with the FLOAT part 1c when the level discrimination device is set to FLOAT 1 mode [111]. Then, all the output signals from the output terminals Q2, Q1 and Q0 fall to logic level "0" when an ACR (all clear) signal supplied to the shift register 11 rises to logic level "1", i.e. $V_{DD}$ level. In this case, the output signal from the output terminal Q0 is inverted by the inverter 13, thus providing a signal of logic level "1". This signal is supplied to the input terminal (IT) 2 through the resistor 14. Then, the inputs MQ 2, MQ 1, MQ 0 and AI of the ROM 12 have logic level "0", logic level "0", logic level "0" and logic level "1", respectively. The outputs XMQ 2, XMQ 1, XMQ 0 of the ROM 12 therefore assume logic level "1", as evident from the truth table of FIG. 5. These outputs are supplied to the input terminals D2, D1 and D0 of the shift register 11. When the clock pulse of 32 Hz rises to logic level "1", the signals are shifted to the output terminals Q2, Q1 and Q0, respectively, of the shift register 11. The input terminal (IT) 2 therefore falls to logic level "0", i.e. $V_{SS}$ level, whereby FLOAT 1 mode [111] is changed to FLOAT 2 mode [100] as illustrated in FIG. 9. As long as the input terminal (IT) 2 remains in a floating state, its output alternately rises to level "1" and falls to level "0". Thus, the input terminal (IT) 2 is brought into alternately FLOAT 1 mode [111] and FLOAT 2 mode [100], thereby indicating that it remains in a floating state. In this case, a code "11" representing the floating state of the input terminal (IT) 2 is supplied through the output terminals SAI 2 and SAI 1 of the ROM 12 according to the truth table of FIG. 5.

Suppose the input terminal (IT) 2 is put into contact with the $V_{DD}$ part 1a when the level discrimination device is set to FLOAT 1 mode [111]. Then, the input terminal (IT) 2 is fixed at logic level "1" (=$V_{DD}$), and FLOAT 1 mode [111] is changed to DUM 2 mode [001] as shown in FIG. 9. Even after the level discrimination device is set to DUM 2 mode, the input terminal (IT) 2 remains at logic level "1". Hence, the mode is changed to $V_{DD}$ mode [101]. In $V_{DD}$ mode [101], the input terminal (IT) 2 remains at logic level "1" and no mode transition takes place. In this case, a code "01" representing the $V_{DD}$ state of the input terminal (IT) 2 is supplied through the output terminals SAI 2 and SAI 1 of the ROM 12 according to the truth table of FIG. 5.

Suppose the input terminal (IT) 2 is put into contact with the $V_{SS}$ part 1b when the level discrimination device is set to FLOAT 2 mode [100]. Then, the input terminal (IT) 2 is fixed at logic level "0" (=$V_{SS}$) and FLOAT 2 mode [100] is changed to DUM 1 mode [000] as shown in FIG. 9. Thereafter, the input terminal (IT) 2 remains at logic level "0" in DUM 1 mode [000]. Hence, the mode is changed to $V_{SS}$ mode [010]. In $V_{SS}$ mode [010] the input terminal (IT) 2 stays at logic level "0", and no mode transition takes place. In this case, a code "00" representing the $V_{SS}$ state of the input terminal (IT) 2 is supplied through the output terminals SAI 2 and SAI 1 of the ROM 12.

DUM 1 to DUM 4, shown in FIG. 9, are dummy modes for preventing chattering which would otherwise occur during the short period of mode transition from the stable state of $V_{DD}$ part 1a, $V_{SS}$ part 1b and FLOAT part 1c to the next stable state.

The code signals corresponding to the respective levels of the input terminal (IT) 2, $V_{SS}$ level, $V_{DD}$ level and FLOAT level, are supplied from the ROM 12 to the MODE ROM 15 in sequential order defined by the direction of rotation of the thumb wheel switch. In synchronism with the clock pulses of 8 Hz, the MODE ROM 15 outputs a RIGHT signal if it receives the code signals in the order of the $V_{DD}$, FLOAT and $V_{SS}$ levels and a LEFT signal if it receives the code signals in the order of the $V_{DD}$, $V_{SS}$ and FLOAT levels.

In summary, according to the present invention a single switch can perform signal processing, utilizing a ROM, without requiring complex timing clocks. Hence, the respective levels of a thumb wheel switch may be detected with a simple device, and the direction of rotation of the switch may be easily determined.

What is claimed is:

1. A voltage level discrimination device for a thumb wheel switch comprising:
   a rotatable cylindrical member having on its outer circumference a power source part, a grounding part and an insulating part;
   a conductive terminal successively contacting with said power source part, said grounding part and said insulating part as said rotatable cylindrical member rotates in a first direction, and successively contacts said power source part, said insulating part and said grounding part as said rotatable cylindrical member rotates in a second direction;
   register means electrically connected to said conductive terminal for storing data;
   means for inverting data received from said register means, said inverting means having an input coupled to said register means, and said inverting means having an output coupled to said conductive terminal; and
   means for generating signals indicating the state of said thumb wheel switch, said generating means being electrically connected to said register means, said inverting means and said conductive terminal to receive data from said register means and inverted data from said inverting means and from said conductive terminal corresponding to the state of the switch to supply data to said register means, and to generate a state signal indicating the state of said thumb wheel switch.

2. The device according to claim 1, wherein said register means comprises a shift register for sequentially shifting said data at a constant frequency and outputting said data.

3. The device according to claim 1 or 2, wherein said means for generating said state signal comprises a read only memory.

4. The device according to claim 1, further comprising:
   means for generating a direction signal, electrically connected to said means for generating said state signals whereby the direction of rotation of the switch is indicated.

5. The device according to claim 4, wherein said means for generating a direction signal includes means for detecting switch rotation.

6. The device according to claim 5, wherein said means for generating said direction signal generates said direction signal in accordance with the order in which the state signals are detected by said switch rotation detecting means.

7. The device according to claim 6, wherein said means for generating said direction signal comprises a mode read only memory.

* * * * *